June 24, 1958 V. P. MAGNUSON ET AL 2,840,311
CATHODE RAY TUBE COUNT INDICATOR
Filed Sept. 8, 1952 2 Sheets-Sheet 1
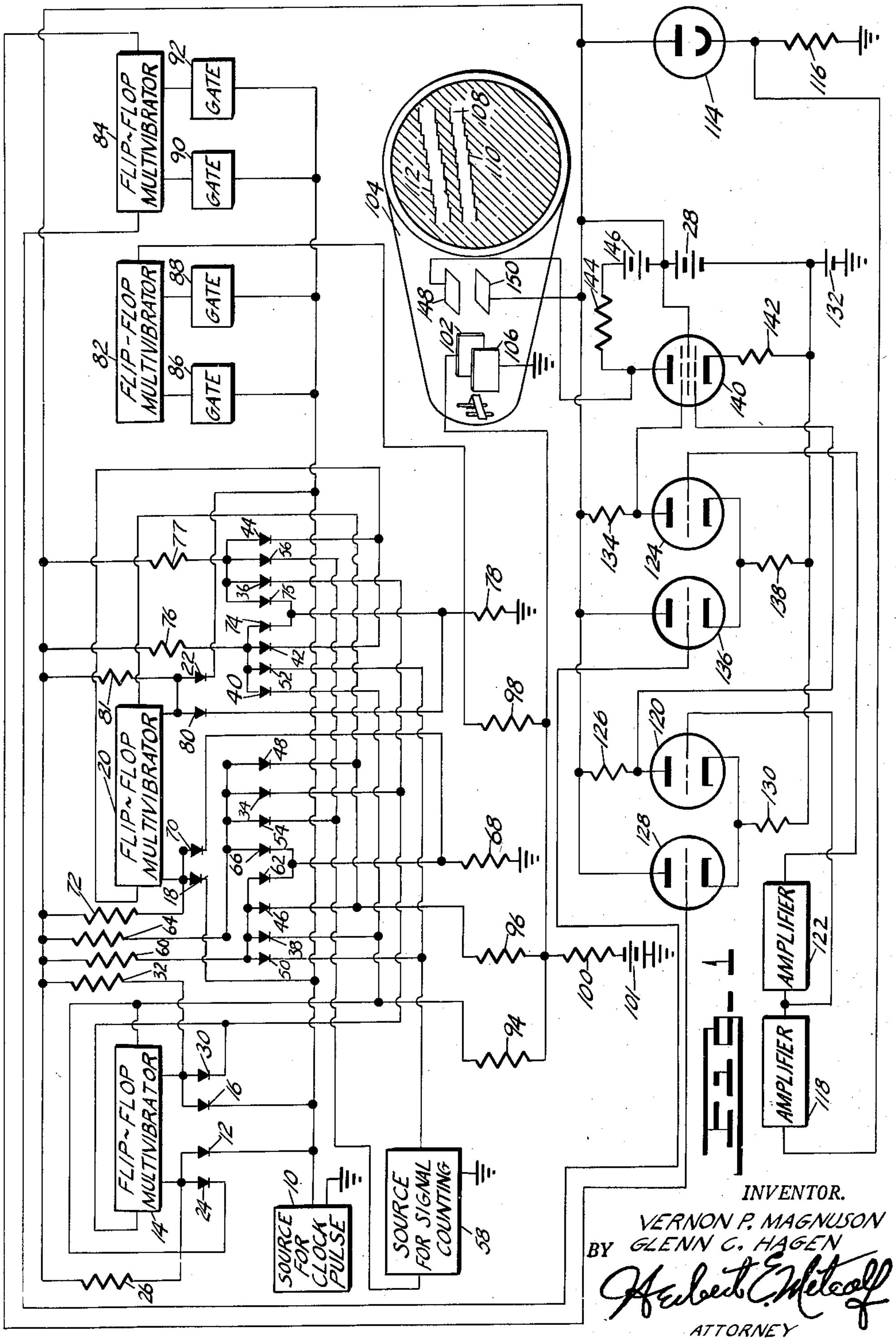
INVENTOR.
VERNON P. MAGNUSON
GLENN C. HAGEN
BY Herbert E. Metcalf
ATTORNEY

CATHODE RAY TUBE COUNT INDICATOR

Filed Sept. 8, 1952

| COUNT | MULTI-VIBRATOR-14 | MULTI-VIBRATOR-20 | MULTI-VIBRATOR-82 | MULTI-VIBRATOR-84 |
|---|---|---|---|---|
| 0 | 0 | 0 | 0 | 0 |
| 1 | 1 | 0 | 0 | 0 |
| 2 | 0 | 1 | 0 | 0 |
| 3 | 1 | 1 | 0 | 0 |
| 4 | 0 | 0 | 1 | 0 |
| 5 | 1 | 0 | 1 | 0 |
| 6 | 0 | 1 | 1 | 0 |
| 7 | 1 | 1 | 1 | 0 |
| 8 | 0 | 0 | 0 | 1 |
| 9 | 1 | 0 | 0 | 1 |
| 10 | 0 | 1 | 0 | 1 |
| 11 | 1 | 1 | 0 | 1 |
| 12 | 0 | 0 | 1 | 1 |
| 13 | 1 | 0 | 1 | 1 |
| 14 | 0 | 1 | 1 | 1 |
| 15 | 1 | 1 | 1 | 1 |

INVENTOR.
VERNON P. MAGNUSON
GLENN E. HAGEN
BY Herbert E. Metcalf
ATTORNEY 2,840,311

CATHODE RAY TUBE COUNT INDICATOR

Vernon P. Magnuson, Gardena, and Glenn E. Hagen, Manhattan Beach, Calif., assignors to Northrop Aircraft, Incorporated, Hawthorne, Calif., a corporation of California Application September 8, 1952, Serial No. 308,358

3 Claims. (Cl. 235—92)

This invention relates to a system for counting a plurality of signals and for instantaneously indicating the count and more particularly to a system for converting a digital count into an instantaneously intelligible indication on the face of a cathode ray tube.

In many computers, it is desired to make a count of a variable quantity represented by a plurality of finite pulses and to provide an indication of the count. Systems are known for accurately counting the pulses even when the pulses occur very rapidly and build up to a relatively large number. But the circuitry required to produce such a fast and high count is relatively detailed and the number of components, including vacuum tubes, is relatively large.

This invention provides a system which employs a minimum number of components to produce a large count and an accurate and instantaneous indication of the count. The system minimizes the number of components by employing a relatively few multivibrators to count a predetermined number and by reinstituting the count in the multivibrators every time that the predetermined number or a multiple thereof is counted.

The system also employs a cathode ray tube having its face masked to provide a plurality of rows rising diagonally. Every time that an integral multiple of the predetermined number is counted, the beam in the tube completes its movement through one row and commences its movement in the row immediately above the first row. By noting the number of rows traversed by the beam and the exact position of the beam in the row, the total number counted can be easily determined.

An object of this invention is to provide a system for producing an instantaneous and reliable indication of a relatively high pulse count on the face of a cathode ray tube.

Another object is to provide a system of the above character for converting a digital count of pulses into an analogue indication represented by the position of a beam on the face of a cathode ray tube.

A further object is to provide a system of the above character requiring a minimum number of components to produce a fast and reliable indication of a relatively large count of pulses.

Still another object is to provide a system of the above character which can count pulses at a faster rate than systems now in use because of the elimination of all movable parts such as relays.

A still further object is to provide a system of the above character which is simple, compact and accurate.

Other objects and advantages will be apparent from a detailed description of the invention and from the appended drawings and claims.

In the drawings:

Figure 1 is a circuit diagram, partly in block form, of one embodiment of the invention;

Figure 2 is an enlarged view illustrating in detail the appearance of the face of a cathode ray tube shown in Figure 1.

Figures 3, 4:
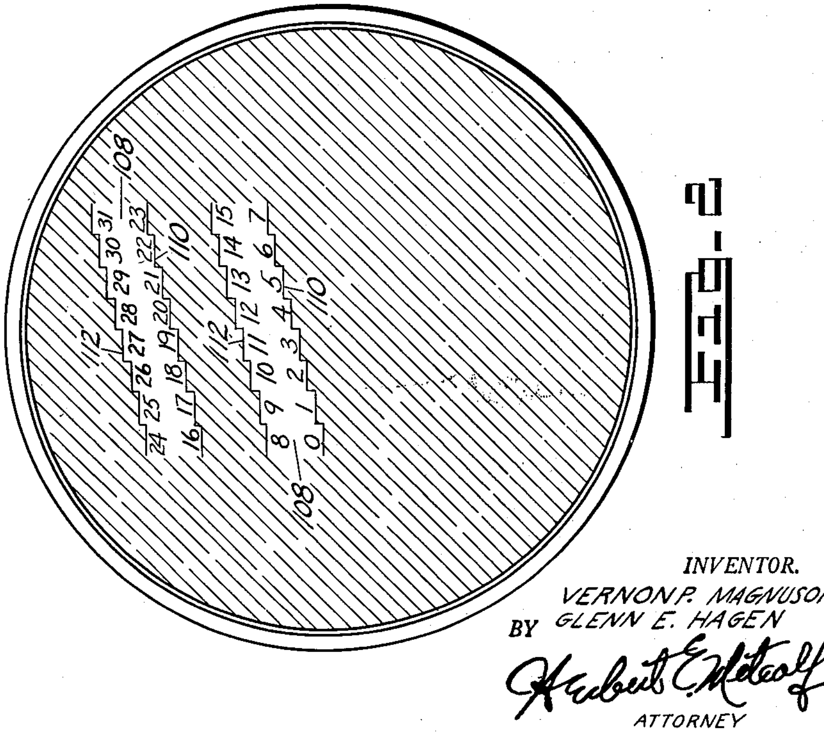
Figure 3 is a chart illustrating the pattern in which certain of the components shown in Figure 1 operate.

In one embodiment of the invention, a source 10 is adapted to provide clock pulses at regular intervals. The pulses from the source 10 are introduced through a crystal diode 12 to the grid of the left tube in a flip-flop multivibrator 14 and through a crystal diode 16 to the grid of the right tube in the multivibrator. In like manner, the signals from the source 10 are introduced to a crystal diode 18 associated with the grid of the left tube in a flip-flop multivibrator 20 and to a crystal diode 22 associated with the grid of the right tube in the multivibrator.

Connections are also made to the grid of the left tube in the multivibrator 14 through a crystal diode 24 from the plate of the right tube in the multivibrator and through a resistance 26 from the positive terminal of a suitable power supply, such as a battery 28. Similarly, the grid of the right tube in the multivibrator is connected through a crystal diode 30 to the plate of the left tube in the multivibrator and through a resistance 32 to the positive terminal of the battery 28.

In addition to being connected to the diode 30, the plate of the left tube in the multivibrator 14 is connected to crystal diodes 34 and 36 associated with the grids of the left and right tubes, respectively, in the multivibrator 20. In like manner, the plate of the right tube in the multivibrator 14 is connected to crystal diodes 38 and 40 associated with the multivibrator 20. Connections are made from the plate of the left tube in the multivibrator 20 to crystal diodes 42 and 44 and from the plate of the right tube in the multivibrator to crystal diodes 46 and 48.

Crystal diodes 50, 52, 54 and 56 are connected to a source 58, which produces pulses at substantially the same instant that clocking signals are produced by the source 10. The diodes 50 and 52 receive positive signals from one terminal of the source 58, and the diodes 54 and 56 receive positive signals from another terminal of the source. The pattern of the positive and negative signals from the source 58 may correspond to the signals obtained from a pick-up head upon the rotation of a magnetic drum contiguous to the pick-up head. Positive and negative signals are obtained from the pick-up head in accordance with the pattern of magnetic pulses provided on the periphery of the drum. The use of a magnetic drum and pick-up head to obtain positive and negative signals is fully disclosed in copending application Serial No. 217,478, filed March 26, 1951 by Floyd G. Steele and William F. Collison.

The plates of the diodes 38, 46 and 50 are connected through a resistance 60 to the positive terminal of the battery 28 and are directly connected to the plate of a diode 62. Similarly, connections are made from the plates of the dodes 34, 48 and 54 through a resistance 64 to the positive terminal of the battery 28 and directly to the plate of a diode 66. The cathodes of the diodes 62 and 66 are connected to a grounded resistance 68 and to the cathode of a diode 70. Connections are made from the plate of the diode 70 to the plate of the diode 18, to the grid of the left tube in the multivibrator 20 and to a resistance 72 in series with the battery 28.

The plates of the diodes 40, 42 and 52 and of the diodes 36, 44 and 56 are connected to the plates of diodes 74 and 75 and to resistances 76 and 77, respectively, in a manner similar to that disclosed above. The cathodes of the diodes are connected to a grounded resistance 78 and to the cathode of a diode 80. The plates of the diodes 22 and 80 are in turn connected to the grid of the right tube in the multivibrator 20 and to a resistance 81 in series with the battery 28.

In addition to the flip-flop multivibrators 14 and 20, a pair of flip-flop multivibrators 82 and 84 are provided. The grid of the left tube in the multivibrator 82 is connected to a diode network shown in block form as a gate circuit 86, and the grid of the right tube is connected to a diode network shown in block form as a gate 88. Connections are also made from gate circuits 90 and 92 to the grids of the left and right tubes, respectively, of the multivibrator 84.

The use of multivibrators, as the multivibrators 14, 20, 82, and 84, for counters by intercoupling in a manner similar to that shown between the multivibrators 14 and 20 is well known in the art. One such arrangement is shown in Figure 33 of co-pending application Serial No. 217,478 filed on March 26, 1951 by Floyd G. Steele and William F. Collison. The equations disclosing the logic behind the particular connections of the different diodes forming each gate are shown in Figure 29 of the co-pending application. An arrangement is also shown for setting up four multivibrators, as the multivibrators 14, 20, 82, and 84, to accumulate a pulse count in an article entitled "The binary quantizer" by Kay Howard Barney, beginning on page 962 of a magazine Electrical Engineering, for November 1949.

The plates of the right tubes in the multivibrators 14, 20 and 82 are connected to resistances 94, 96 and 98, respectively. The resistances 94, 96 and 98 have a common terminal which is connected to a resistance 100 in series with a battery 101 having its positive terminal grounded. The resistances 94, 96 and 98 have predetermined values relative to each other. For example, if the resistance 94 has a value of approximately 4R, the resistances 96 and 98 may have values of approximately 2R and R respectively.

The common terminal between the resistances 94 and 100 is connected to a plate 102 for deflecting the beam in a cathode ray tube 104 in a horizontal direction. A second plate 106 for controlling the horizontal deflection of the beam in the tube 104 is grounded. The face of the tube 104 has opaque portions which define a plurality of transparent strips 108 (Figure 2). The bottom of each transparent strip is defined by a plurality of notches which rise diagonally, and the top of each strip is defined by a plurality of similar notches. In this way, each strip defines a pair of notched rows 110 and 112 (Figure 2). The top notch of each row is slightly below the bottom notch of the next highest row. An appropriate numeral may be printed adjacent each notch and on the transparent portion of the tube face to provide an instantaneous indication of the pulse count, as illustrated in Figure 2.

A photo tube 114 having a plate and a cathode is positioned in front of the face of the cathode ray tube 104 to provide a current when the beam in the cathode ray tube is incident on one of the transparent strips 108. The tube 114 is so disposed that it is sensitive only to light from the cathode ray tube 104. The anode of the tube 114 is connected to the positive terminal of the battery 28, and the cathode is connected to a grounded resistance 116 and to an input terminal of an amplifier 118 shown in block form. The output terminal of the amplifier 118 is connected to the grid of a tube 120 and to the input terminal of an amplifier 122 also shown in block form. The output terminal of the amplifier 122 is in turn connected to the grid of a tube 124.

Voltage is applied to the plate of the tube 120 through a suitable resistance 126 from the positive terminal of the battery 28. The cathode of the tube 120 is connected to the cathode of a tube 128 and to one terminal of a resistance 130, the other terminal of which is connected to the positive terminal of a bias battery 132 having its negative terminal grounded. Connections are made from the plate of the tube 128 to the positive terminal of the battery 28 and from the grid of the tube 128 to the plate of the right tube in the flip-flop multivibrator 84.

Similarly, a positive voltage is applied from the positive terminal of the battery 28 through a suitable resistance 134 to the plate of the tube 124. The cathode of the tube 124 is connected to the cathode of a tube 136 and to one terminal of a resistance 138 having its other terminal connected to the positive terminal of the battery 132. The plate of the tube 136 has a positive voltage applied to it from the positive terminal of the battery 28, and the grid of the tube 136 has a voltage applied to it from the plate of the left tube in the multivibrator 84.

In addition to being connected to the resistances 126 and 134, the plates of the tubes 120 and 124 are respectively connected to the control grid and the suppressor grid of a pentode 140. A slightly positive bias is applied to the cathode of the pentode 140 through a resistance 142 in series with the battery 132. A positive voltage is applied to the screen grid of the pentode 140 from the battery 28, and a positive voltage of relatively large magnitude is applied to the plate of the pentode through a resistance 144 from a battery 146 in series with the batteries 28 and 132. The voltage on the plate of the pentode 140 is in turn applied to a plate 148 for producing a vertical deflection of the beam in the cathode ray tube 104. A second plate 150 for controlling the vertical deflection of the beam is connected to the battery 28.

The multivibrators 14, 20, 82 and 84 are connected in an arrangement to provide a digital count on a binary basis of numbers from "0" to "15." For a count of "0," the left tube in each multivibrator is cut off, and the right tube is conducting because of a relatively high voltage on the grid of the tube. Since the right tubes in the multivibrators are conducting, the voltages on the plates of the right tubes are relatively low. This is indicated in Figure 3 by a numeral "0" in the column for each multivibrator.

When a first positive signal is introduced from the source 10 to the cathode of the diode 16, the positive voltage on the cathode of the diode relative to the voltage on the plate prevents current from flowing through the diode. Current also is unable to flow through the diode 30 since a positive voltage is applied on the cathode of the diode from the plate of the left tube in the multivibrator because of the non-conductivity of the left tube. Since current is unable to flow through either the diodes 16 or 30, the voltage on the grid of the right tube in the multivibrator 14 remains high.

At the end of the pulse from the source 10, the voltage on the cathode of the diode 16 becomes relatively low and causes a current to flow through a circuit including the battery 28, the resistance 32 and the diode 16. This current produces a voltage drop across the resistance 32 and causes the voltage on the grid of the right tube in the multivibrator 14 to drop below the value produced during the absence of any current through the resistance. The voltage drop on the grid of the right tube of the multivibrator 14 causes the tube to become cut off and a relatively high voltage to be produced on the plate of the tube. This relatively high voltage is designated in Figure 3 by the numeral "1" in the column for the multivibrator 14. Such a designation indicates a numerical count of "1."

When a relatively high voltage is produced on the plate of the right tube in the multivibrator 14, it is introduced to the grid of the left tube in the multivibrator to produce a conduction of the tube. Upon the production of the next positive pulse by the source 10, the coincidence of this pulse with a relatively high voltage on the cathode of the diode 24 causes the left tube in the multivibrator 14 to become cut off and the right tube to start conducting. In this way, each of the two tubes in the multivibrator 14 is triggered into a state of non-conductivity upon the introduction of alternate signals from the source 10.

As indicated by the chart in Figure 3, the right tube in the multivibrator 20 is changed from a state of conductivity to a state of non-conductivity when the plate of the right tube in the multivibrator 14 and the plate of the left tube in the multivibrator 20 have relatively high voltages applied to them. In addition to these voltage states, a positive pulse of voltage must be applied to the diode 52 from the source 58 before any current flow through the resistance 76 can be interrupted. Upon the simultaneous occurrence of these voltage states, a positive signal appears on the plate of the diode 74 and causes current to flow through a circuit including the battery 28, the resistance 76, the diode 74 and the resistance 78.

The positive voltage produced across the resistance 78 by the flow of current through the resistance causes the voltage on the cathode of the diode 80 to rise. At the same time, the voltage on the cathode of the diode 22 rises because of the introduction of a clock pulse from the source 10. When these voltage relationships occur, the voltage on the grid of the right tube in the multivibrator 20 remains high because of the interruption of any current flow through the resistance 81. The voltage on the grid of the multivibrator tube remains relatively high until the end of the pulse from the source 10. At the end of this pulse, current flows through the resistance 81 and the diode 22 and causes the voltage on the grid of the right tube in the multivibrator 20 to fall. This fall in voltage causes the right multivibrator tube to be triggered into a condition of non-conductivity. As indicated by the numeral "1" in the column for the multivibrator 20, a positive voltage on the plate of the right tube in the multivibrator 20 indicates a count of "2."

In like manner, the left tube in the multivibrator 20 is triggered into a state of non-conductivity upon the simultaneous introduction of positive voltages to the diodes 18, 38, 46 and 50. Such a simultaneous introduction of positive voltages occurs when the voltages on the plates of the right tubes in the multivibrators 14 and 20 are relatively high and positive voltage pulses are simultaneously introduced from the sources 10 and 58.

When the source 58 fails to produce a positive signal at substantially the same instant as the production of a clock pulse by the source 10, an indication is provided that an integer must be subtracted from the count previously made. For example, if the count is +4 at such a time, an integer must be subtracted from the value of +4 to indicate a resultant value of +3. The indication to subtract an integer is provided by a positive pulse from the left terminal of the source 58.

The positive pulse from the left terminal in the source 58 is applied to diode networks associated with the left and right tubes in the multivibrator 20. Upon the introduction of such a positive signal to the cathode of the diode 54, the left tube in the multivibrator 20 becomes cut off if relatively high voltages are simultaneously introduced to the diodes 18, 34 and 48. Similarly, the right tube in the multivibrator 20 becomes cut off when a pulse is introduced to the diode 56 from the left terminal in the source 58 at the same time that relatively high voltages are applied to the diodes 22, 36 and 44.

The count of the positive and negative signals from the source 58 continues into the multivibrators 82 and 84 in a similar manner in accordance with the passage of signals through the gates 86, 88, 90 and 92. The passage of signals through each gate is determined by the voltage levels on the diodes forming the gate.

During the time that the right tube in the multivibrator 14 is cut off, the relatively high voltage on the plate of the tube causes a large current to flow through the resistances 94 and 100. The increased flow of current through the resistance 100 produces a rise in the voltage at the common terminal between the resistances 94 and 100 over the voltage produced at the terminal when the voltage on the plate of the right tube is relatively low.

In like manner, the relatively high voltage on the plate of the right tube in the multivibrator 20 when the tube is cut off causes an increased current to flow through the resistances 96 and 100. Since the resistance 96 has a smaller value than the resistance 94, the current through the resistance 100 is greater than the current when the right tube in the multivibrator 14 is cut off. This causes the voltage at the common terminal between the resistances 96 and 100 to increase over that produced by cutting off the right tube in the multivibrator 14.

The voltage at the common terminal between the resistance 96 and 100 rises still further when the right tube in the multivibrator 82 is cut off, since the resistance 98 has a lower resistance than either the resistances 94 or 96. By cutting off different combinations of the right tubes in the multivibrators 14, 20 and 82, the voltage at the common terminal between the resistances 96 and 100 can be progressively increased. In this way, the voltage at the common terminal between the resistances 96 and 100 provides an indication of the pulse count in the multivibrators.

The voltage at the common terminal between the resistances 96 and 100 is applied to the deflection plate 102 to produce a horizontal deflection of the beam in the cathode ray tube 104. The distance through which the beam is deflected increases with increments in the count provided by the multivibrators 14, 20 and 82. Upon a count of "7," the beam is deflected horizontally through a maximum distance because the right tubes in all of the multivibrators 14, 20 and 82 are cut off.

When the count is increased by an integer to the numeral "8," the right tubes in the multivibrators 14, 20 and 82 again become conductive, and the beam is returned to its original position at the left of the tube 124. This process is repeated upon a transition from a count of "15" to a count of "16" and upon every subsequent increase of the count by "8" or a multiple thereof.

Upon an increase in count in the range from "0" to "7," the beam is deflected horizontally to the right, as disclosed above. This causes the beam to move horizontally from a transparent portion to an opaque portion of the tube 104. When the beam is in the opaque portion of the tube 104, no current flows through the tube 114 or the resistance 116. The resultant low voltage produced across the resistance 116 is amplified and inverted by the amplifier 118 and introduced in positive form to the grid of the tube 120. Since the tube 120 has a cathode resistance 130 common to it and the tube 128, the state of conductivity of the tube 128 affects the conductivity of the tube 120.

If the count is between the numerals "0" and "7," the right tube of the multivibrator 84 is conducting, as indicated in Figure 3. Conductivity of the right tube in the multivibrator 84 causes a relatively low voltage to be applied from the plate of the tube to the grid of the tube 128 so that the tube 128 becomes cut off. When the tube 128 becomes cut off, the voltage on the cathode of the tube falls because of the failure of any current to flow through the resistance 130.

The combination of the relatively low voltage on the cathode of the tube 120 and the relatively high voltage on the grid of the tube causes the tube to start conducting and a relatively low voltage to be produced on the plate of the tube. This voltage is introduced to the grid of the pentode 140 to cut off the tube. Upon the cutoff of the pentode 140, current flow through the resistance 144 is interrupted, and a relatively high voltage is produced on the plate of the tube. This voltage is introduced to the plate 148 to produce an upward deflection of the beam. The beam moves upwardly until it reaches the transparent portion 108.

When the beam reaches the transparent portion 108, current flows through the tube 114 and produces a positive voltage across the resistance 116. After being amplified and inverted, the positive voltage across the resistance 116 is introduced to the grid of the tube 120 as a relatively low voltage. This voltage is sufficiently low to cause the tube 120 to become cut off even though the voltage on the cathode of the tube is relatively low. The resultant high voltage on the plate of the tube 120 is introduced to the control grid of the pentode 140.

The relatively high voltage produced across the resistance 116 is also introduced to the grid of the tube 124. The tube 124 is associated with the tube 136 as a result of the common resistance 138. Since the tube 136 has a relatively high voltage introduced to its grid from the plate of the left tube in the multivibrator, current flows through it and the resistance 138 and produces a positive voltage on its cathode. This voltage is sufficiently positive to cut off the tube 124 even though a positive voltage is introduced to the grid of the tube. The resultant positive voltage on the plate of the tube 124 is applied to the suppressor grid of the pentode 140.

Because of the positive voltages on the control and suppressor grids of the pentode 140, current flows through the resistance 144 and the pentode and causes a relatively low voltage to be produced on the plate of the pentode. When introduced to the plate 148, this voltage produces a downward deflection of the beam in the tube 104 into the opaque portion of the tube. Upon the movement of the beam into the opaque portion of the tube 104, the pentode 140 again becomes cut off and introduces a relatively high voltage to the plate 148 to produce an upward movement of the beam.

In this way, the beam oscillates vertically at a horizontal position indicative of the pulse count. The oscillation occurs at such a rate as to provide an indication of the beam position on the transparent portion of the tube 104. Because of the numeral printed on the transparent portion of the tube 104 adjacent each notch, an instantaneous indication is provided of the pulse count.

During a count from "8" to "15," the right tube in the multivibrator 84 is cut off and a relatively high voltage is produced on the plate of the tube for introduction to the grid of the tube 128. This voltage causes the tube 128 to conduct and the voltage on the cathode of the tube to become relatively high. Because of the common connection between the cathodes of the tubes 120 and 128, the relatively high voltage on the cathode of the tube 120 prevents the tube from conducting regardless of whether a high or low voltage is introduced to its grid from the amplifier 118.

Since the left tube in the multivibrator 84 is conducting at the time that the right tube is cut off, a relatively low voltage is produced on the plate of the left multivibrator tube and is introduced to the grid of the tube 136. This voltage prevents the tube 136 from conducting so that a relatively low voltage is produced at the common terminal between the cathodes of the tubes 136 and 124. Because of the relatively low voltage on the cathode of the tube 124, the tube conducts when a relatively high signal is introduced to its grid and becomes cut off when a relatively low signal is introduced to its grid.

A relatively high signal is introduced to the grid of the tube 124 when the beam in the cathode ray tube 104 is incident upon a transparent strip 108. The relatively low voltage produced at the plate of the tube 124 as a result of the current flowing through the tube causes the pentode 140 to become cut off and a relatively high voltage to be introduced from the plate of the pentode to the deflecting plate 148. This high voltage acts to produce an upward movement of the beam from the transparent region adjacent the bottom row 112 to the opaque region immediately above the row.

When the beam becomes incident upon the opaque portion of the tube, a signal having a relatively low voltage is produced at the output terminal of the amplifier 122 and is introduced to the grid of the tube 124 so as to cut off the tube. The resultant high voltage on the suppressor grid of the pentode 140 in combination with the high voltage on the control grid of the pentode causes a current to flow through the pentode and a relatively low voltage to be applied on the plate 148. The relatively low voltage on the plate 148 produces a downward movement of the beam. In this way, the beam oscillates between the transparent and opaque portions of the tube 124 adjacent the bottom row 112 at a horizontal position corresponding to the accumulated count.

As will be seen, the action of the multivibrator 84 causes the beam to move upwardly from the opaque portion to the transparent portion of the tube 104 when the count is between "0" and "7" and to move downwardly into the transparent portion when the count is between "8" and "15." This corresponds to the opposite dispositions of the rows 110 and 112 relative to the opaque portion of the tube.

In like manner, the multivibrator 84 acts to control the movement of the beam in the proper vertical direction for counts above the numeral "15." Vertical control of the beam is maintained even while the beam is moving from the right end of one row to the left end of the next highest row. Such vertical control is maintained because the beam is moving entirely within the transparent portion of the tube upon the continuance of a count from a row 110 to a row 112 and it is moving entirely within the opaque portion of the tube upon the continuance of a count from a row 112 to a row 110.

The system disclosed above has several important advantages. It provides an instantaneous visual indication of the count that has been made of pulses from a source and it is capable of providing such an instantaneous indication over a relatively wide numerical range, while at the same time it provides an analog voltage representative of the digital value indicated and registered. The analog voltage being the voltage appearing at the plate 148 of the tube 104, or at the plate of the tube 140. The system is also advantageous in that it requires a minimum number of counting stages, such as the multivibrators 14, 22, 82 and 84, to provide an indication of the count over the wide range. In addition, the system is able to count at a relatively fast rate because it does not require any movable parts such as relays.

Although a system has been disclosed for providing an indication only of a resultant positive count, it can be easily adapted to provide indications of negative counts as well. This can be accomplished by providing on the face of the tube 104 transparent strips which move diagonally downward with progressive increases in distance from left to right. Such strips have not been shown for purposes of simplification and convenience.

Although this invention has been disclosed and illustrated with reference to particular applications, the principles involved are susceptible of numerous other applications which will be apparent to persons skilled in the art. The invention is, therefore, to be limited only as indicated by the scope of the appended claims.

What is claimed is:

1. In combination, a cathode ray tube, means for deflecting a beam in the tube in a first direction, means for deflecting the beam in a second direction substantially perpendicular to the first direction, means for providing on the face of the tube opaque portions of diagonal configuration with respect to said first and said second directions, the opaque portions being disposed to provide a plurality of similarly diagonal parallel light-transmissive strips, means for providing a digital count of a finite quantity, means for providing increased displacements of the beam in the first direction with increases in the digital count, means for returning the beam to its initial position in the first direction upon each full displacement of the beam in that direction, and means for displacing the beam in the second direction through a distance dependent upon the total movement of the beam in the first direction.

2. In combination, a cathode ray tube, means for deflecting a beam in the tube in a first direction, means for deflecting a beam in the tube in a second direction substantially perpendicular to the first direction, means for providing on the face of the tube opaque portions having a diagonal configuration, the opaque portions being disposed to provide a plurality of similarly diagonal parallel light-transmissive strips, means for providing a digital count of a finite quantity, means for displacing the beam in the first direction through a distance dependent upon the digital count, means for returning the beam to its original position in the first direction upon each full displacement of the beam in the first direction, means for displacing the beam in the second direction in accordance with the displacement of the beam in the first direction and through a distance to maintain the beam in a light-transmissive strip of the tube, and means for alternating the direction of movement of the beam in the second direction to maintain it within a light-transmissive strip of the tube upon each return of the beam to its original position in the first direction.

3. In combination, a cathode ray tube, a first pair of plates in the tube for displacing a beam in the tube in a horizontal direction, a second pair of plates in the tube for displacing the beam in a vertical direction, means for masking the face of the tube to provide a plurality of transparent areas extending diagonally upwardly on the face of the tube, a counter for providing a digital count of a finite quantity, means connected between the counter and the first pair of plates in the cathode ray tube for displacing the beam progressively in the horizontal direction upon each increase in the digital indications of the finite quantity, means for returning the beam to its initial position in the horizontal direction upon each integral multiple of a predetermined number in the digital count, and means connected to the second pair of plates in the cathode ray tube for displacing the beam in the vertical direction in accordance with the progressive displacement of the beam in the horizontal direction to maintaining the beam within the transparent rows on the face of the tube for providing a visual indication of the digital count, and an analog signal indication of the digital count.

References Cited in the file of this patent

UNITED STATES PATENTS

| | | |
|---|---|---|
| 2,404,106 | Snyder | July 16, 1946 |
| 2,462,263 | Haynes | Feb. 22, 1949 |
| 2,513,442 | Baker | July 4, 1950 |
| 2,540,016 | Sunstein | Jan. 30, 1951 |
| 2,568,449 | Hansen | Sept. 18, 1951 |
| 2,591,842 | Llewellyn | Apr. 8, 1952 |
| 2,603,418 | Ferguson | July 15, 1952 |
| 2,715,678 | Barney | Aug. 16, 1955 |

OTHER REFERENCES

"Theory and Techniques for Design of Electronic Digital Computers," volume III, Univ. of Pa., Moore School of E. E., Phila., Pa., June 30, 1948; pages 3–19 to 3–26, 33–11 to 33–13, and 33–18, 33–27 and 33–35, dwgs. 33–36 to 33–38.